(12) United States Patent
Shim

(10) Patent No.: US 12,439,254 B2
(45) Date of Patent: Oct. 7, 2025

(54) ELECTRONIC DEVICE AND METHOD OF CONTROLLING REMOTE LOCKING OF EXTERNAL ELECTRONIC DEVICE BASED ON BLUETOOTH

(71) Applicant: SAMSUNG ELECTRONICS CO., LTD., Suwon-si (KR)

(72) Inventor: Woochul Shim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 416 days.

(21) Appl. No.: 17/580,216

(22) Filed: Jan. 20, 2022

(65) Prior Publication Data

US 2022/0232379 A1 Jul. 21, 2022

Related U.S. Application Data

(63) Continuation of application No. PCT/KR2022/000831, filed on Jan. 17, 2022.

(30) Foreign Application Priority Data

Jan. 20, 2021 (KR) .................. 10-2021-0008212

(51) Int. Cl.
*H04W 12/069* (2021.01)
*H04W 4/80* (2018.01)

(52) U.S. Cl.
CPC .......... *H04W 12/069* (2021.01); *H04W 4/80* (2018.02)

(58) Field of Classification Search
CPC ................ H04W 12/069; H04W 4/80
See application file for complete search history.

(56) References Cited

U.S. PATENT DOCUMENTS 11,445,700 B2 * 9/2022 Abels ................ H04W 84/10
2006/0128305 A1 * 6/2006 Delalat ................ H04L 63/18
455/41.2

(Continued)

FOREIGN PATENT DOCUMENTS

JP 2015-192357 A 11/2015
JP 2018-33162 A 3/2018

(Continued)

OTHER PUBLICATIONS

International Search Report (PCT/ISA/210) dated Apr. 19, 2022 issued in International Application No. PCT/KR2022/000831.

(Continued)

*Primary Examiner* — Jung W Kim
*Assistant Examiner* — Alan L Kong
(74) *Attorney, Agent, or Firm* — Sughrue Mion, PLLC

(57) ABSTRACT

According to various embodiments, an electronic device may include a communication interface; a memory configured to store authentication information shared with an external electronic device; and a processor configured to: identify a loss of the external electronic device based on a failure of a communication connection to the external electronic device for a first specified time period; obtain information related to the loss of the external electronic device, and generate a remote lock request message requesting locking of the external electronic device, the remote lock request message including the information related to the loss of the external electronic device and the authentication information shared with the external electronic device; and transmit the remote lock request message to an external server through the communication interface. Other embodiments may also be available.

20 Claims, 12 Drawing Sheets

(56) References Cited

U.S. PATENT DOCUMENTS

| | | | |
|---|---|---|---|
| 2011/0320535 A1* | 12/2011 | Donaldson | H04W 12/068 709/204 |
| 2013/0326642 A1* | 12/2013 | Hajj | G06F 3/017 726/34 |
| 2016/0105763 A1* | 4/2016 | Liu | H04W 4/02 455/411 |
| 2016/0142403 A1 | 5/2016 | Lee | |
| 2017/0006425 A1 | 1/2017 | Tang et al. | |
| 2017/0134898 A1* | 5/2017 | Vega | H04W 12/50 |
| 2017/0325065 A1* | 11/2017 | Azam | H04W 8/20 |
| 2017/0339151 A1 | 11/2017 | Van Os et al. | |
| 2018/0338032 A1 | 11/2018 | Baek et al. | |
| 2019/0018987 A1* | 1/2019 | Pai | G06T 19/006 |
| 2020/0107164 A1* | 4/2020 | Lopatin | G01S 5/0284 |
| 2020/0260267 A1 | 8/2020 | Venkatachalam et al. | |
| 2020/0313868 A1 | 10/2020 | Vendelbo | |
| 2020/0404883 A1 | 12/2020 | Abels et al. | |

FOREIGN PATENT DOCUMENTS

| | | |
|---|---|---|
| JP | 2020-184747 A | 11/2020 |
| KR | 10-2010-0011060 A | 2/2010 |
| KR | 10-2011-0050837 A | 5/2011 |
| KR | 10-1525164 B1 | 6/2015 |
| KR | 10-2016-0038478 A | 4/2016 |
| KR | 10-2017-0014406 A | 2/2017 |
| KR | 10-2017-0097290 A | 8/2017 |
| KR | 10-2019-0015006 A | 2/2019 |

OTHER PUBLICATIONS

Written Opinion (PCT/ISA/237) dated Apr. 19, 2022 issued in International Application No. PCT/KR2022/000831.

Communication dated Feb. 3, 2025 issued by the Korean Intellectual Property Office in Korean Patent Application No. 10-2021-0008212.

Office Action issued Jul. 1, 2025 by the Korean Patent Office for KR Patent Application No. 10-2021-0008212.

\* cited by examiner

ELECTRONIC DEVICE AND METHOD OF CONTROLLING REMOTE LOCKING OF EXTERNAL ELECTRONIC DEVICE BASED ON BLUETOOTH

CROSS-REFERENCE TO RELATED APPLICATIONS

This application is a continuation of International Application No. PCT/KR2022/000831 designating the United States, filed on Jan. 17, 2022, in the Korean Intellectual Property Receiving Office and claiming priority to Korean Patent Application No. 10-2021-0008212, filed on Jan. 20, 2021, in the Korean Intellectual Property Office, the disclosures or which are incorporated by reference herein in their entireties.

BACKGROUND

Field

Various example embodiments relate to an electronic device and a method for controlling remote locking of an external electronic device in the electronic device.

Description of Related Art

Various electronic devices are being provided to users, and the users may access various types of content while carrying the electronic devices with them. Such an electronic device may be connected to an external electronic device by a wireless network technology for connection to external devices, to provide extended functions. For example, the electronic device may be connected to an external electronic device by a Bluetooth network technology among various wireless network interfaces and execute various functions while exchanging data with the external electronic device through Bluetooth communication.

For example, electronic devices may have various topologies such as 1:1, 1:N, or N:N and connect Bluetooth communication to each other. In the case of a 1:1 connection, the electronic device and the external electronic device may be connected based on Bluetooth Legacy or Bluetooth low energy (BLE). Each of the electronic device and the external electronic device may operate as a controller (or master) or a controllee (or slave) during connection establishment.

A user may lose an external electronic device, while carrying the external electronic device. The electronic device and the external electronic device may be connected to each other by scan, response, and connection operations through Bluetooth communication in a short range. When the lost external electronic device is out of a specified distance, it may be difficult for the electronic device and the external electronic device to execute Bluetooth communication-based functions. For example, the external electronic device may be a wearable device (or a small electronic device, or an electronic device capable of Bluetooth communication with the electronic device) (e.g., an ear microphone, a headset, a smart watch, or an electronic device capable of Bluetooth communication with other electronic devices). Once the external electronic device is lost, the external electronic device may be difficult to find. Moreover, the lost external electronic device may be searched for, connected to, and illegally used by another electronic device of another user.

SUMMARY

According to various embodiments, when an external electronic device that can perform a function trough a Bluetooth-based connection to an electronic device is lost, the electronic device may control remote locking of the lost external electronic device.

According to various embodiments, when an external electronic device that can perform a function trough a Bluetooth-based connection to an electronic device is lost, the electronic device may control remote locking of the lost external electronic device through a server and a remote electronic device.

According to aspects of some example embodiments, an electronic device may include a communication interface; a memory configured to store authentication information shared with an external electronic device; and a processor configured to: identify a loss of the external electronic device based on a failure of a communication connection to the external electronic device for a first specified time period; obtain information related to the loss of the external electronic device, and generate a remote lock request message requesting locking of the external electronic device, the remote lock request message including the information related to the loss of the external electronic device and the authentication information shared with the external electronic device; and transmit the remote lock request message to an external server through the communication interface.

According to aspects of some example embodiments, a server may include a communication interface; a memory configured to store program code; and a processor configured to access the memory, read the program code, and operate according to the program code to: receive, from an electronic device, a remote lock request message for an external electronic device, the remote lock request message requesting locking of the external electronic device; identify at least one remote electronic device corresponding to a location of a loss of the external electronic device by using the received remote lock request message; and transmit, to the identified at least one remote electronic device.

According to aspects of some example embodiments, a remote electronic device may include a communication interface; a memory configured to store program code; and a processor configured to access the memory, read the program code, and operate according to the program code to, receive a remote lock request message from a server, the remote lock request message requesting locking of an external electronic device; and generate a Bluetooth-based advertising packet including the remote lock request message, and broadcast the Bluetooth-based advertising packet.

According to aspects of some example embodiments, a method of controlling remote locking of an external electronic device based on Bluetooth, performed by an electronic device, may include: storing authentication information, which is shared with the external electronic device during a Bluetooth-based connection between the electronic device and the external electronic device; identifying a loss of the external electronic device based on a failure of the Bluetooth-based connection to the external electronic device for a first specified time period; obtaining information related to the loss of the external electronic device; generating a remote lock request message requesting locking of the external electronic device, the remote lock request message including the information related to the loss of the external electronic device and the authentication information shared with the external electronic device; and transmitting the remote lock request message to an external server through a communication interface.

According to aspects of some example embodiments, a method of transmitting a remote lock request message, performed by a server, may include receiving a remote lock request message for an external electronic device from an electronic device, the remote lock request message requesting locking of the external electronic device; identifying at least one remote electronic device corresponding to a location of a loss of the external electronic device by using the received remote lock request message; and transmitting the remote lock request message to the identified at least one remote electronic device.

According to aspects of some example embodiments, a method of controlling remote locking of an external electronic device based on Bluetooth, performed by a remote electronic device, may include receiving a remote lock request message for the external electronic device from an outside, the remote lock request message requesting locking of the external electronic device; generating a Bluetooth-based advertising packet including the remote lock request message; and broadcasting the Bluetooth-based advertising packet.

According to aspects of some example embodiments, a non-transitory computer readable storage medium may store instructions, which are executable by at least one processor to cause the at least one processor to perform: storing authentication information, which is shared with an external electronic device during a Bluetooth-based connection between an electronic device and the external electronic device; identifying a loss of the external electronic device based on a failure of the Bluetooth-based connection to the external electronic device for a specified time period; obtaining information related to the loss of the external electronic device; generating a remote lock request message requesting locking of the external electronic device, the remote lock request message including the information related to the loss of the external electronic device and the authentication information shared with the external electronic device; and transmitting the remote lock request message to an external server through a communication interface.

According to various example embodiments, when an external electronic device that executes a function through a Bluetooth-based connection to an electronic device is lost, the lost external electronic device may be remotely locked to prevent unauthorized use of the external electronic device.

According to various example embodiments of the disclosure, when an external electronic device that executes a function through a Bluetooth-based connection with an electronic device is lost, the electronic device may remotely lock the lost external electronic device through a server and a remote electronic device, and thus prevent connection between the external electronic device and another electronic device.

It will be appreciated by persons skilled in the art that the effects that can be achieved with the disclosure are not limited to what has been particularly described hereinabove and other advantages of the disclosure will be more clearly understood from the following detailed description taken in conjunction with the accompanying drawings.

BRIEF DESCRIPTION OF THE DRAWINGS

The above and other objects and features of the disclosure will become apparent by describing in detail embodiments thereof with reference to the accompanying drawings.

Regarding the description of the drawings, the same or similar reference numerals may be used to denote the same or similar components.

DETAILED DESCRIPTION

Hereinafter, various example embodiments of the disclosure may be described with reference to accompanying drawings. However, those of ordinary skill in the art will understand that the disclosure is not limited to a specific embodiment, and modifications, equivalents, and/or alternatives on the various embodiments described herein may be variously made without departing from the scope and spirit of the disclosure.

The terms as used in the disclosure are provided to merely describe specific embodiments, not intended to limit the scope of the disclosure. Singular forms include plural referents unless the context clearly dictates otherwise. The terms and words as used herein, including technical or scientific terms, may have the same meanings as generally understood by those skilled in the art. The terms as generally defined in dictionaries may be interpreted as having the same or similar meanings as or to contextual meanings of the relevant art. Unless otherwise defined, the terms should not be interpreted as ideally or excessively formal meanings. Even though a term is defined in the disclosure, the term should not be interpreted as excluding embodiments of the disclosure under circumstances.

Figure 1:
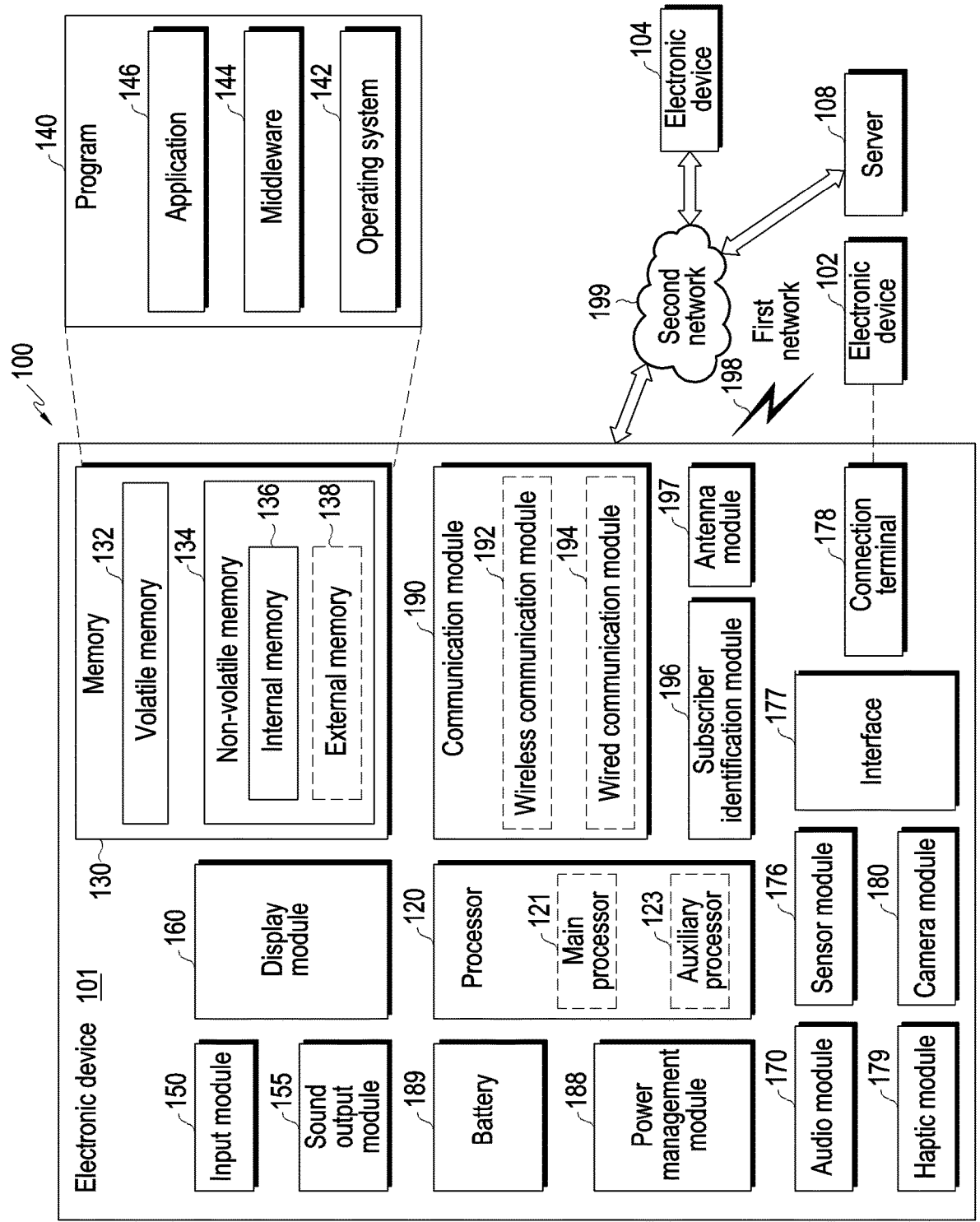
FIG. 1 is a block diagram illustrating an electronic device in a network environment according to an embodiment.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network).

According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form an mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
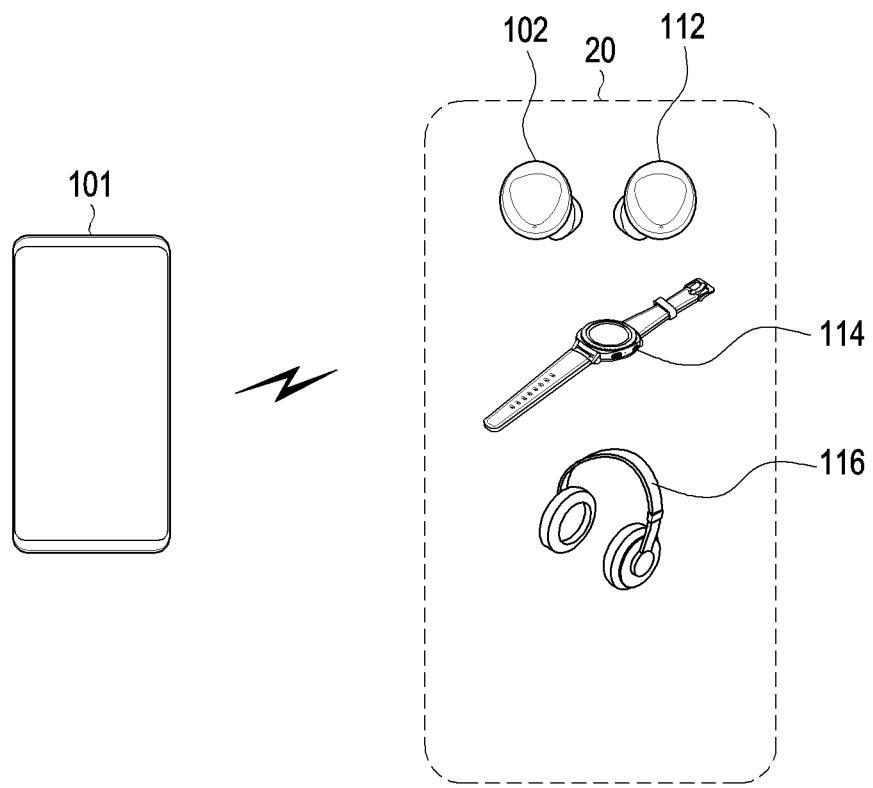
FIG. 2 is a diagram illustrating an electronic device and an external electronic device according to an embodiment.

FIG. 2 is a diagram illustrating an electronic device and an external electronic device according to an embodiment.

Referring to FIG. 2, a function may be performed through a Bluetooth-based communication connection to the electronic device (e.g., the electronic device 101 of FIG. 1) according to an embodiment. The external electronic device (e.g., the electronic device 102 of FIG. 1) may be one of external electronic devices 20. For example, the electronic device 101 may be a smart phone, and each of the external electronic devices 20 may be a wearable device. For example, the wearable device may be any of wireless earphones 102 and 112, a smart watch 114, a wireless headset 116, or another device connectable to the electronic device 101 through Bluetooth communication. According to an embodiment, the electronic device 101 may establish a Bluetooth (or Bluetooth Legacy) communication connection with the external electronic device 102 through pairing. According to an embodiment, the electronic device 101 may share authentication information (e.g., an authentication key) with the external electronic device 102 during the Bluetooth pairing.

According to an embodiment, when the external electronic device 102 is lost and thus is out of a specified distance from the electronic device, it may be difficult to perform a Bluetooth communication-based function. According to an embodiment, the electronic device 101 may identify the location of the loss of the external electronic device 102, obtain information related to the loss of the external electronic device 102, and then transmit a remote lock request message to remotely lock the external electronic device 102. According to an embodiment, the remote lock request message may be transmitted to a remote electronic device (e.g., the electronic device 104 of FIG. 1) at the location of the loss through a server (e.g., 108 in FIG. 1), broadcasted by the remote electronic device, and be provided to the external electronic device 102. The remote lock request message includes a request for locking of the external electronic device 102, and the external electronic device 102 may perform a locking operation based on the broadcasted remote lock request message.

Figure 3:
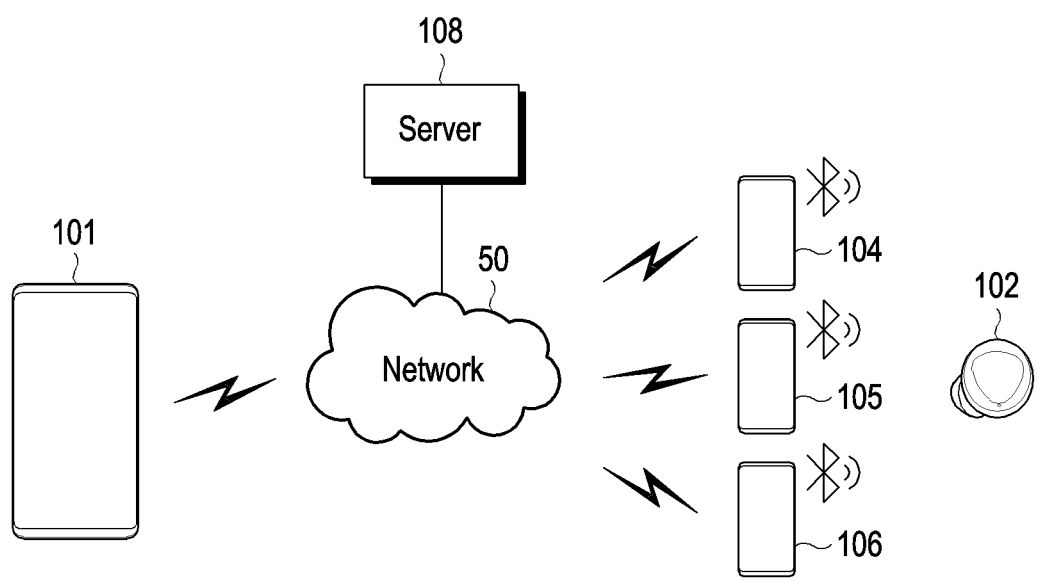
FIG. 3 is a diagram schematically illustrating an electronic device for remote locking of an external electronic device, a server, a remote electronic device, and an external electronic device according to an embodiment.

FIG. 3 is a diagram schematically illustrating an electronic device for remote locking of an external electronic device, a server, a remote electronic device, and the external electronic device according to an embodiment.

Referring to FIG. 3, the electronic device 101 according to an embodiment may be a device capable of performing a function through a Bluetooth-based connection to the external electronic device 102. The electronic device 101 according to an embodiment may store authentication information shared during establishment of a Bluetooth-based connection (e.g., pairing) with the external electronic device 102 in the memory 130. The electronic device 101 according to an embodiment may identify whether the external electronic device 102 has been lost and obtain information related to the loss of the external electronic device 102. According to an embodiment, the electronic device 101 may generate a remote lock request message including information (e.g., a message (Msg)) related to the loss of the external electronic device 102 and authentication information (e.g., a message authentication code key(Msg) (MACKey(Msg)) shared with the external electronic device 102. According to an embodiment, the electronic device 101 may transmit the remote lock request message to the server 108 through a network 50. According to an embodiment, the authentication information shared with the external electronic device 102 may include an authentication key shared during Bluetooth pairing between the electronic device 101 and the external electronic device 102 or a specified (or agreed) message authentication code. According to an embodiment, the information related to the loss of the external electronic device 102 may include an ID of the external electronic device 102, the location (or estimated location) of the loss of the external electronic device 102, the time (or estimated time) of the loss of the external electronic device 102, and/or surrounding information collected during a predetermined time period (e.g., several seconds, minutes, or hours) before and after the loss of the external electronic device 102. For example, the location and time of the loss of the external electronic device 102 may include information about the time and location of the most recently terminated Bluetooth pairing between the electronic device 101 and the external electronic device 102. As non-limiting examples, the surrounding information collected during the predetermined time period before and after the loss of the external electronic device 102 may be information about the movement direction of the electronic device 101 collected during the predetermined time period before and after the loss, information about the movement speed of the electronic device 101 collected during the predetermined time period before and after the loss, information about a location change of the electronic device 101 collected during the predetermined time period before and after the loss, information about a movement means (e.g., vehicle or walking) of the electronic device 101 collected during the predetermined time period before and after the loss, information about another electronic device (e.g., another wearable electronic device), connected to the electronic device 101, collected during the predetermined time period before and after the loss, or network information (e.g., information related to access points (APs) around the electronic device 101 (e.g., the service set identifier (SSID) of each of the APs or the reference signal strength indicator (RSSI) of a signal received from each of the APs), and/or information about a base station in a second network connected to the electronic device 101) collected by the electronic device 101 during the predetermined time period before and after the loss. According to an embodiment, in addition to the above-described information, the information related to the loss of the external electronic device 102 may include any other information, as far as the information indicates whether the external electronic device 102 has been lost, relates to the location of the loss, and/or has been collected at the time of the loss.

After transmitting the remote lock request message to the server 108, the electronic device 101 according to an embodiment may receive a message indicating whether the server 108 has transmitted the remote lock request message for the external electronic device 102. For example, the electronic device 101 may receive a message indicating that transmission of the remote lock request message from the server 108 to at least one remote electronic device (e.g., 104) is successful or failed. When the lost external electronic device 102 is detected and thus the electronic device 101 is Bluetooth-paired with the external electronic device 102 after receiving a message indicating successful transmission of the remote lock request message, the electronic device 101 according to an embodiment may transmit information indicating release of the remote locking to the server 108.

The server 108 according to an embodiment may receive the remote lock request message for the external electronic device 102 from the electronic device 101. The server 108 according to an embodiment may identify at least one remote electronic device 104, 105, and 106 corresponding to the location of the loss of the external electronic device 102 by using the received remote lock request message. Hereinafter, the remote electronic device 104 will be described as an example. For example, the server 108 may identify the location of the loss by using the information related to the loss of the external electronic device 102 included in the remote lock request message received from the electronic device 101. The server 108 according to an embodiment may identify the remote electronic device 104 at the identified location of the loss or within a predetermined radius from the identified location of the loss. For example, the remote electronic device 104 may include a mobile communication electronic device or a Bluetooth electronic device installed in a fixed location. For example, the server 108 may identify, as the remote electronic device 104, an electronic device which has transmitted location information corresponding to the location of the loss based on location information received from a plurality of electronic devices or based on pre-stored information about the locations of electronic devices. The server 108 according to an embodiment may also identify at least one remote electronic device 104 accessible to an AP (e.g., a WiFi AP) at the identified location of the loss or within a predetermined radius from the identified location of the loss through the AP. The server 108 according to an embodiment may transmit the remote lock request message to the at least one identified remote electronic device 104.

After receiving the remote lock request message and forwarding the remote lock request message to the at least one remote electronic device 104, the server 108 according to an embodiment may transmit, to the electronic device 101, a message indicating that the remote lock request message has been transmitted to the at least one remote electronic device 104. For example, when the server 108 has failed to transmit the remote lock request message to the at least one remote electronic device 104, the server 108 may transmit a message indicating the failure of transmitting the remote lock request message to the electronic device 101. Upon receipt of information indicating that the external electronic device 102 is released from the remote locking from the electronic device 101, the server 108 according to an embodiment may discontinue the remote lock request message transmission operation.

The remote electronic device 104 according to an embodiment may receive the remote lock request message from the server 108. The remote electronic device 104 according to an embodiment may generate a Bluetooth-based advertising packet by using the remote lock request message. For example, the remote electronic device 104 may generate an advertising packet including a message "remote lock request=Msg+MACKey (Msg)" in advertisement (AD) Data area of a manufacturer specific data type area. The remote electronic device 104 according to an embodiment may broadcast the Bluetooth-based advertising packet including the remote lock request message.

The external electronic device 102 according to an embodiment may receive the advertising packet broadcasted from the remote electronic device 104. The external electronic device 102 according to an embodiment may identify and authenticate the remote lock request message included in the received advertising packet. For example, the external electronic device 102 may identify whether the message "remote lock request=Msg+MACKey (Msg)" is included in the AD data of the manufacturer specific data type area included in the advertising packet. For example, when the message "remote lock request=Msg+MACKey(Msg)" is included, the external electronic device 102 may identify whether an ID included in the Msg (information related to the loss of the external electronic device 102) matches its ID. When the IDs match, the validity of the Msg may be verified by using the MACKey (Msg) (authentication information shared with the external electronic device 102). According to an embodiment, when the ID included in the Msg matches the ID of the external electronic device 102 and the Msg is valid (Valid=Verifykey(Msg, MACkey(Msg))), the external electronic device 102 may identify that the remote lock request message has been verified. According to an embodiment, when the ID included in the Msg does not match the ID of the external electronic device 102 or the Msg is invalid (Invalid=Verifykey(Msg, MACkey(Msg))), the external electronic device 102 may identify that the remote lock request message has not been verified. According to an embodiment, the external electronic device 102 may perform locking based on the identification and successful verification of the remote lock request message. For example, when the external electronic device 102 identifies the remote lock request message and then fails in verifying the remote lock request message, the external electronic device 102 may ignore the remote lock request message. For example, when the external electronic device 102 identifies the remote lock request message and then successfully verifies the remote lock request message, the external electronic device 102 may perform locking based on the remote lock request message. According to an embodiment, in the locked state, the external electronic device 102 may be configured to be paired only with a device which was previously paired or has been paired with the external electronic device, while rejecting Bluetooth pairing with a new device. According to an embodiment, the external electronic device 102 may be configured to ignore a reset button input in the locked state. When the electronic device 101 performs Bluetooth pairing with the external electronic device 102 in the locked state according to an embodiment, the external electronic device 102 may be released from the locked state.

According to an embodiment, the lost external electronic device 102 may set itself to a locked state without a remote lock request message. For example, when a predetermined time (e.g., one or more hours) has elapsed after termination of Bluetooth pairing in an ON state, the external electronic device 102 may autonomously operate in the locked state. Alternatively, the external electronic device 102 may identify a fall (e.g., whether the external electronic device 102 has fallen) by using a fall detection device (e.g., a microphone, an acceleration sensor, or a gyro sensor) and autonomously operate in the locked state upon detection of the fall. Alternatively, when the external electronic device 102 includes a pair of first and second electronic devices (e.g., a pair of wireless earphones), the external electronic device 102 may identify whether the first and second electronic devices are within reach. When the first and second electronic devices are not within reach, the external electronic device 102 may autonomously enter the locked state. Alternatively, the external electronic device 102 may always enter the locked state before being discharged. According to an embodiment, the external electronic device 102 may set itself to the locked state according to other conditions. Under each individual condition or a combination of two or more of the conditions, the external electronic device 102 may set itself to the locked state.

Figure 4:
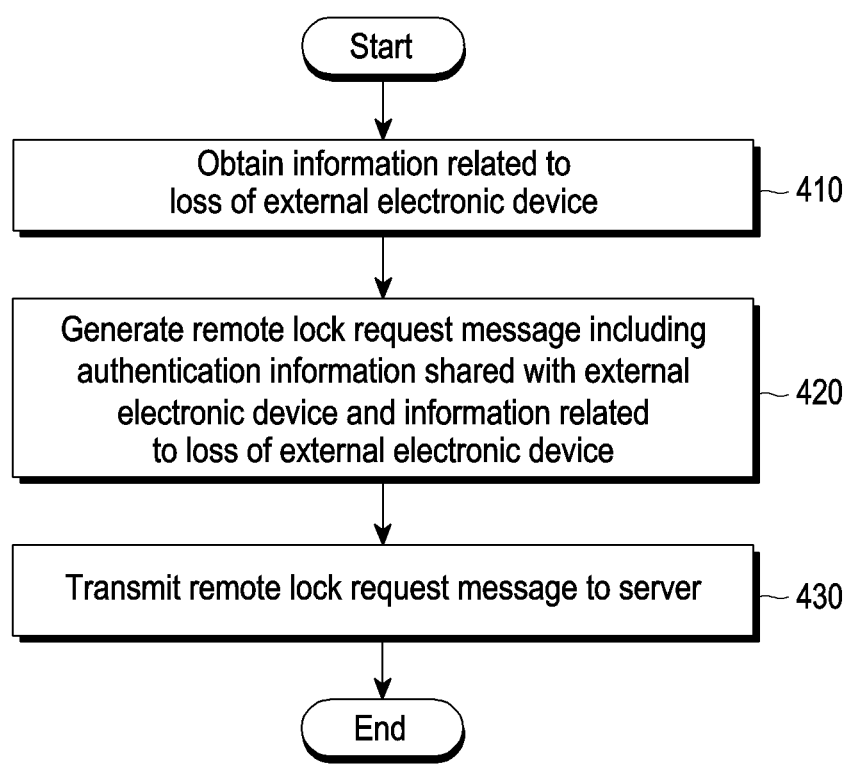
FIG. 4 is a flowchart illustrating an operation of controlling remote locking of an external electronic based on Bluetooth in an electronic device according to an embodiment.

FIG. 4 is a flowchart illustrating an operation of remotely locking an external electronic device based on Bluetooth in an electronic device according to an embodiment.

Referring to FIG. 4, the processor (e.g., the processor 120 of FIG. 1) of the electronic device 101 according to an embodiment may perform at least one of operations 410 to 430.

In operation 410, the processor 120 according to an embodiment may identify whether the external electronic device 102 has been lost and obtain information related to the loss of the external electronic device 102. According to an embodiment, the processor 120 may identify whether the external electronic device 102 has been lost based on failure of a communication connection to the external electronic device 102 for a specified time period. According to an embodiment, the processor 120 may identify whether the external electronic device 102 has been lost based on the failure of the communication connection to the external electronic device 102 for the specified time period and the remaining battery level of the external electronic device 120. According to an embodiment, when Bluetooth pairing has not been performed with the external electronic device 102 for a specified time or longer after a Bluetooth connection was requested to the external electronic device 102, the processor 120 may identify that the external electronic device 102 has been lost. According to an embodiment, when the external electronic device 102 still has an available remaining battery capacity (e.g., identified from the remaining battery level of the external electronic device 102 obtained during the previous connection) and Bluetooth pairing with the external electronic device 102 has not been performed during a specified time or longer after the processor 120 requested a Bluetooth connection to the external electronic device 102, the processor 120 may identify that the external electronic device 102 has been lost. According to an embodiment, Bluetooth pairing with the external electronic device 102 has not been performed during a specified time or longer after the processor 120 requested a Bluetooth connection to the external electronic device 102 taken out from a case (not shown), the processor 120 may identify that the external electronic device 102 has been lost. According to an embodiment, the processor 120 may identify that the external electronic device 102 has been lost based on a user input (e.g., an input indicating the loss).

According to an embodiment, the information related to the loss of the external electronic device 102 may include the ID of the external electronic device 102, the location (or estimated location) of the loss of the external electronic device 102, the time (or estimated time) of the loss of the external electronic device 102, or surrounding information collected during a predetermined time period (e.g., several seconds, minutes, or hours) before and after the loss of the external electronic device 102. For example, the location and time of the loss of the external electronic device 102 may include information about the time and location of the most recently terminated Bluetooth pairing between the electronic device 101 and the external electronic device 102. As non-limiting examples, the surrounding information collected during the predetermined time period before and after the loss of the external electronic device 102 may be information about the movement direction of the electronic device 101 collected during the predetermined time period before and after the loss, information about the movement speed of the electronic device 101 collected during the predetermined time period before and after the loss, information about a location change of the electronic device 101 collected during the predetermined time period before and after the loss, information about a movement means (e.g., vehicle or walking) of the electronic device 101 collected during the predetermined time period before and after the loss, information about another electronic device (e.g., another wearable electronic device), connected to the electronic device 101, collected during the predetermined time period before and after the loss, or network information (e.g., information related to APs around the electronic device 101 (e.g., the service set identifier (SSID) of each of the APs or the reference signal strength indicator (RSSI) of a signal received from each of the APs), and/or information about a base station in a second network connected to the electronic device 101) collected by the electronic device 101 during the predetermined time period before and after the loss. According to an embodiment, the surrounding information collected during the predetermined time period before and after the loss of the external electronic device 102 may be stored in the electronic device 101 and then displayed through the display module 160. According to an embodiment, the surrounding information collected during the predetermined time period before and after the loss of the external electronic device 102 may be transmitted to the server 108 and processed together with other information (e.g., by combination, modification, and/or processing into other information) to be received and used by the electronic device 101.

According to an embodiment, in addition to the above-described information, the information related to the loss of the external electronic device 102 may include any other information, as far as the information indicates whether the external electronic device 102 has been lost, relates to the location of the loss, and/or has been collected at the time of the loss.

In operation 420, the processor 120 according to an embodiment may generate a remote lock request message including information (e.g., a message (Msg)) related to the loss of the external electronic device 102 and authentication information (e.g., a message authentication code key(Msg) (MACKey(Msg)) shared with the external electronic device 102. According to an embodiment, the authentication information shared with the external electronic device 102 may include an authentication key shared during Bluetooth pairing between the electronic device 101 and the external electronic device 102 or a specified (or agreed) message authentication code.

In operation 430, the processor 120 according to an embodiment may transmit the remote lock request message to the server 108.

Figure 5A:
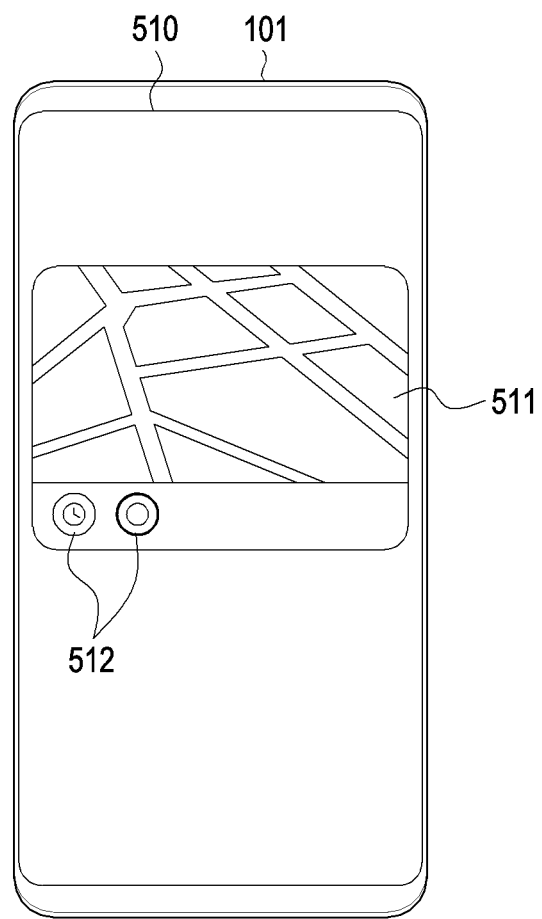
FIG. 5A is a diagram illustrating a screen for finding the location of an external electronic device according to an embodiment.
Figure 5B:
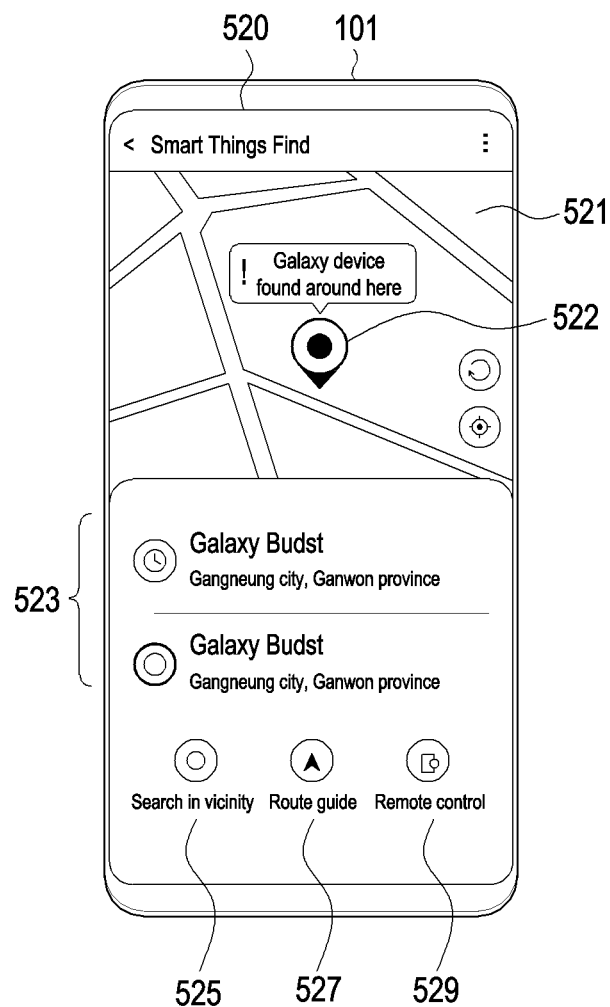
FIG. 5B is a diagram illustrating a screen indicating the detected location of the external electronic device according to an embodiment.
Figure 5C:
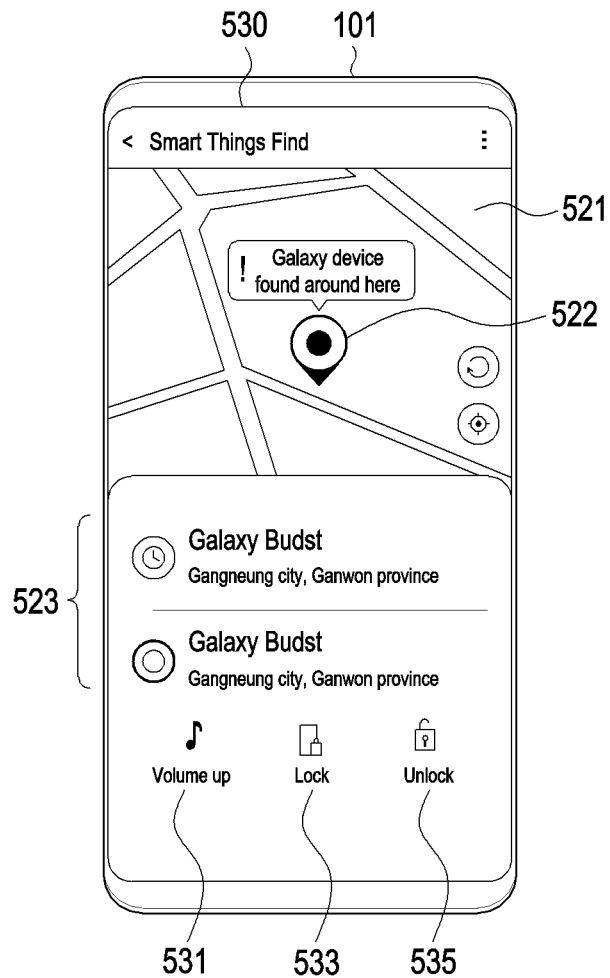
FIG. 5C is a diagram illustrating a screen including a remote control menu for the detected external electronic device according to an embodiment.

FIGS. 5A, 5B and 5C are exemplary diagrams illustrating screens for controlling remote locking of an external electronic device in an electronic device according to an embodiment.

FIG. 5A is a diagram illustrating a screen for finding the location of an external electronic device according to an embodiment. FIG. 5B is a diagram illustrating a screen indicating the detected location of the external electronic device according to an embodiment. FIG. 5C is a diagram illustrating a screen including a remote control menu for the detected external electronic device according to an embodiment.

Referring to FIG. 5A, the processor 120 of the electronic device 101 according to an embodiment may display a screen 510 for controlling remote locking of an external electronic device through the display module 160, based on execution of an application (e.g., an application, smart things) for controlling remote locking of an external electronic device. The screen 510 for controlling remote locking of an external electronic device according to an embodiment may display an image 511 related to finding an external electronic device (e.g., smart things find) and a target external electronic device 512 to be found.

Referring to FIG. 5B, based on selection (or an input, e.g., a touch input) of the target external electronic device 512 to be found, the processor 120 of the electronic device 101 according to an embodiment may display a screen 520 indicating the detected external electronic device. A map 521, a location 522 of the external electronic device on the map 521, and an address 523 corresponding to the location of the external electronic device may be displayed on the screen 520 indicating the found external electronic device according to an embodiment, and icons 525, 527, and 529 corresponding to functions related to the detected external electronic device may be displayed on the screen 520. For example, the functions related to the detected external electronic device may include a vicinity search function, a route guidance function, or a remote control function. The vicinity search function may be a function of locating the electronic device 101 and providing the location of the electronic device 101. The route guide function may be a function of guiding a route from the location of the electronic device 101 to the location 522 of the detected external electronic device. The remote control function may be a function of remotely controlling the external electronic device 512.

Referring to FIG. 5C, based on selection (or an input, e.g., a touch input) of the remote control function icon 529, the processor 120 of the electronic device 101 according to an embodiment may display a screen 530 including icons of a remote control menu for the detected external electronic device. For example, the remote control menu may include ringing 531, lock 533, and unlock 535. Based on selection (or a (touch) input) of the ringing menu 531, a ringing request message may be transmitted to the external electronic device through the server 108 and the remote electronic device 104. Based on selection (or a (touch) input) of the lock menu 533, a remote lock request message may be transmitted to the external electronic device through the server 108 and the remote electronic device 104. Based on selection (or a (touch) input) of the unlock menu 535, a remote unlock request message may be transmitted to the external electronic device 102 through the server 108 and the remote electronic device 104. The external electronic device 102 may ring in response to reception of the ringing request message, perform locking in response to reception of the remote lock request message, and perform remote unlocking, in response to reception of the remote unlock request message.

Figure 6:
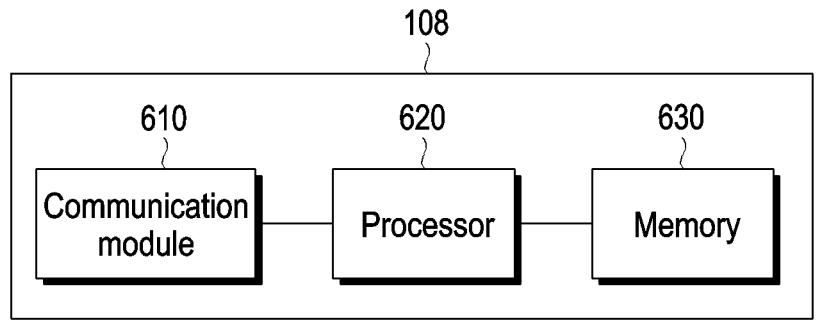
FIG. 6 is a block diagram illustrating a server according to an embodiment.

FIG. 6 is a block diagram illustrating a server according to an embodiment.

Referring to FIG. 6, the server 108 according to an embodiment may include a communication module (or communication interface) 610, a processor 620, and a memory 630.

The communication module 610 according to an embodiment may support establishment of a direct (e.g., wired) communication channel or a wireless communication channel between the electronic device 101 and/or at least one remote electronic device (e.g., 104, 105, or 106) and the server 108, and communication through the established communication channel.

The processor 620 according to an embodiment may receive a remote lock request message for the external electronic device 102 from the electronic device 101 through the communication module 610. The processor 620 according to an embodiment may identify a remote electronic device (e.g., 104, 105, or 106) corresponding to the location of the loss of the external electronic device 102 by using the received remote lock request message. For example, the processor 620 may identify the location of the loss by using information related to the loss of the external electronic device 102 included in the remote lock request message received from the electronic device 101. The processor 620 according to an embodiment may identify at least one remote electronic device 104 at the identified location of the loss or within a predetermined radius from the identified location of the loss. For example, the remote electronic device 104 may include a mobile communication electronic device or a Bluetooth electronic device installed in a fixed location. For example, the processor 620 108 may identify, as the remote electronic device 104, an electronic device which has transmitted location information corresponding to the location of the loss based on location information received from a plurality of electronic devices or based on pre-stored information about the locations of electronic devices. The processor 620 according to an embodiment may also identify at least one remote electronic device 104 accessible to an AP (e.g., a WiFi AP) at the identified location of the loss or within a predetermined radius from the identified location of the loss through the AP. The processor 620 according to an embodiment may transmit the remote lock request message to the at least one identified remote electronic device 104.

The memory 630 according to an embodiment may store various data used for the communication module 610 and/or the processor 620. The data may include, for example, software (e.g., a program) and input data or output data for an instruction related to the software. The memory 630 may include a volatile memory or a non-volatile memory.

Figure 7:
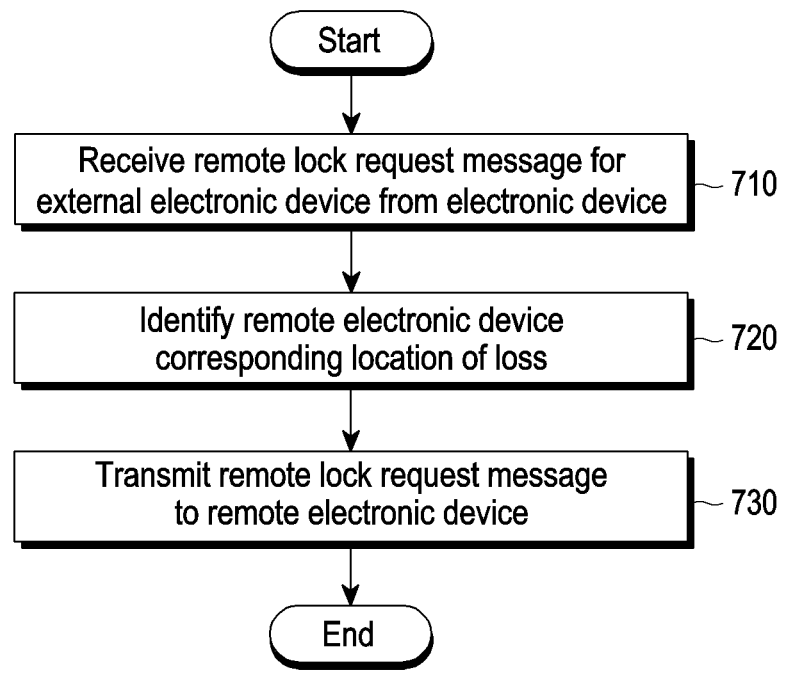
FIG. 7 is a flowchart illustrating an operation of a server according to an embodiment.

FIG. 7 is a flowchart illustrating an operation of a server according to an embodiment.

Referring to FIG. 7, the processor (e.g., the processor 620 of FIG. 6) of the server 108 according to an embodiment may perform at least one of operations 710 to 730.

In operation 710, the processor 620 according to an embodiment may receive a remote lock request message for the external electronic device 102 received from the electronic device 101 through the communication module 610.

In operation 720, the processor 620 according to an embodiment may identify a remote electronic device corresponding to the location of the loss of the external electronic device 102 by using the received remote lock request message. For example, the processor 620 may identify the location of the loss by using information related to the loss of the external electronic device 102 included in the remote lock request message received from the electronic device 101. The processor 620 according to an embodiment may identify at least one remote electronic device 104 at the identified location of the loss or within a predetermined radius from the identified location of the loss. For example, the remote electronic device 104 may include a mobile communication electronic device or a Bluetooth electronic device installed in a fixed location. For example, the processor 620 108 may identify, as the remote electronic device 104, an electronic device which has transmitted location information corresponding to the location of the loss based on location information received from a plurality of electronic devices or based on pre-stored information about the locations of electronic devices. The processor 620 according to an embodiment may also identify at least one remote electronic device 104 accessible to an AP (e.g., a WiFi AP) at the identified location of the loss or within a predetermined radius from the identified location of the loss through the AP.

In operation 730, the processor 620 according to an embodiment may transmit the remote lock request message to the at least one identified remote electronic device 104.

Figure 8:
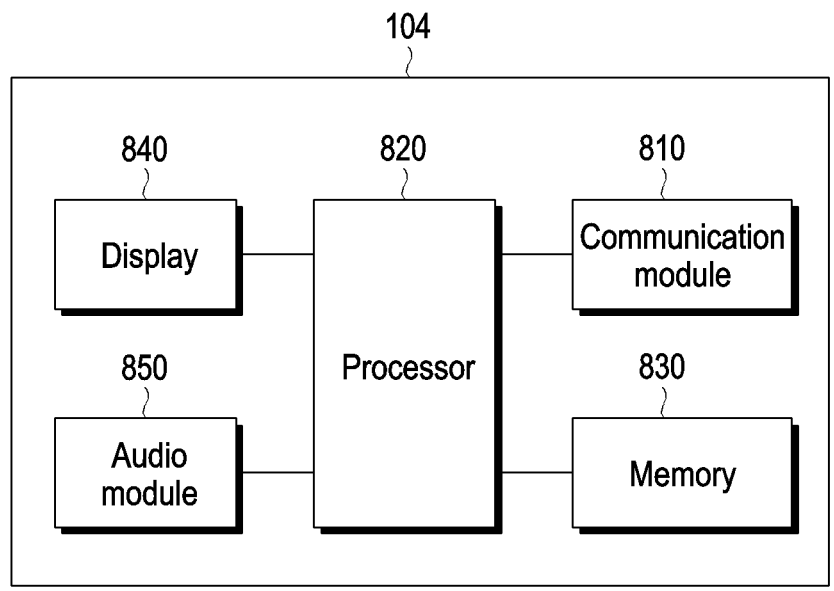
FIG. 8 is a block diagram illustrating a remote electronic device according to an embodiment.

FIG. 8 is a block diagram illustrating a remote electronic device according to an embodiment.

Referring to FIG. 8, the remote electronic device 104 according to an embodiment may include a communication module (or a communication interface) 810, a processor 820, a memory 830, a display 840, and an audio module (or an audio interface) 850.

The communication module 810 according to an embodiment may support establishment of a direct (e.g., wired) communication channel or a wireless communication channel between the remote electronic device 104 and the server 108, and communication through the established communication channel. The communication module 810 may support mobile communication and Bluetooth communication.

The processor 820 according to an embodiment may receive a remote lock request message from the server 108 through the communication module 810. The processor 820 according to an embodiment may generate a Bluetooth-based advertising packet by using the remote lock request message. For example, the processor 820 may generate an advertising packet including a message "remote lock request=Msg+MACKey(Msg)" in AD data of a manufacturer specific data type area. The processor 820 according to an embodiment may broadcast the Bluetooth-based advertising packet including the remote lock request message through the communication module 810.

The memory 830 according to an embodiment may store various data used by the communication module 810 and/or the processor 820. The data may include, for example, software (e.g., a program) and input data or output data for an instruction related to the software. The memory 630 may include a volatile memory or a non-volatile memory.

The display 840 according to an embodiment may display information required for generating and broadcasting the Bluetooth-based advertising packet.

The audio module 850 according to an embodiment may receive or output a sound signal required for generating and broadcasting the Bluetooth-based advertising packet.

Figure 9:
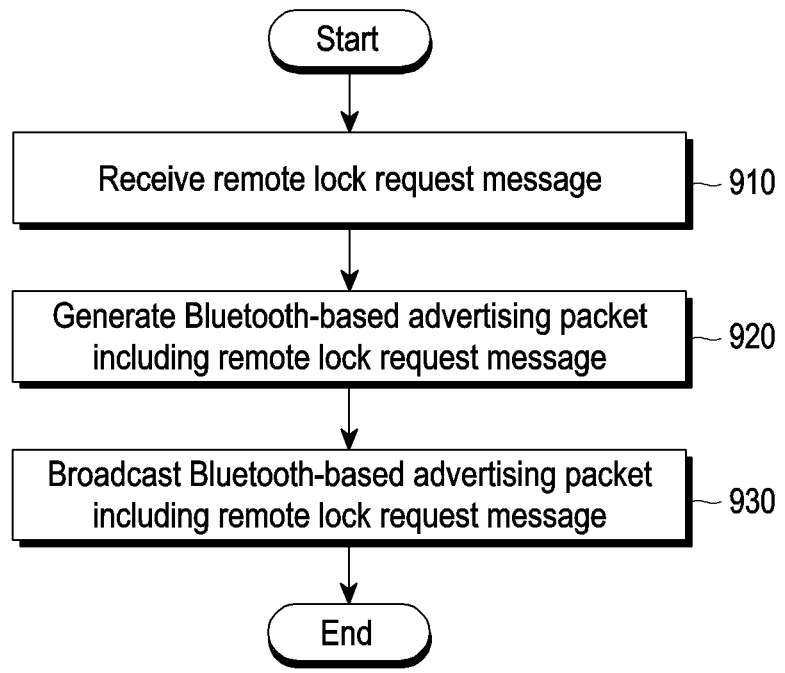
FIG. 9 is a flowchart illustrating an operation of a remote electronic device according to an embodiment.

FIG. 9 is a flowchart illustrating an operation of a remote electronic device according to an embodiment.

Referring to FIG. 9, the processor (e.g., the processor 820 of FIG. 8) of the remote electronic device 104 according to an embodiment may perform at least one of operation 910 to operation 930.

In operation 910, the processor 820 according to an embodiment may receive a remote lock request message from the server 108 through the communication module 810.

In operation 920, the processor 820 according to an embodiment may generate a Bluetooth-based advertising packet by using the remote lock request message. For example, the processor 820 may generate an advertising packet including a message "remote lock request=Msg+MACKey(Msg)" in AD data of a manufacturer specific data type area.

In operation 930, the processor 820 according to an embodiment may broadcast the Bluetooth-based advertising packet including the remote lock request message through the communication module 810.

Figure 10:
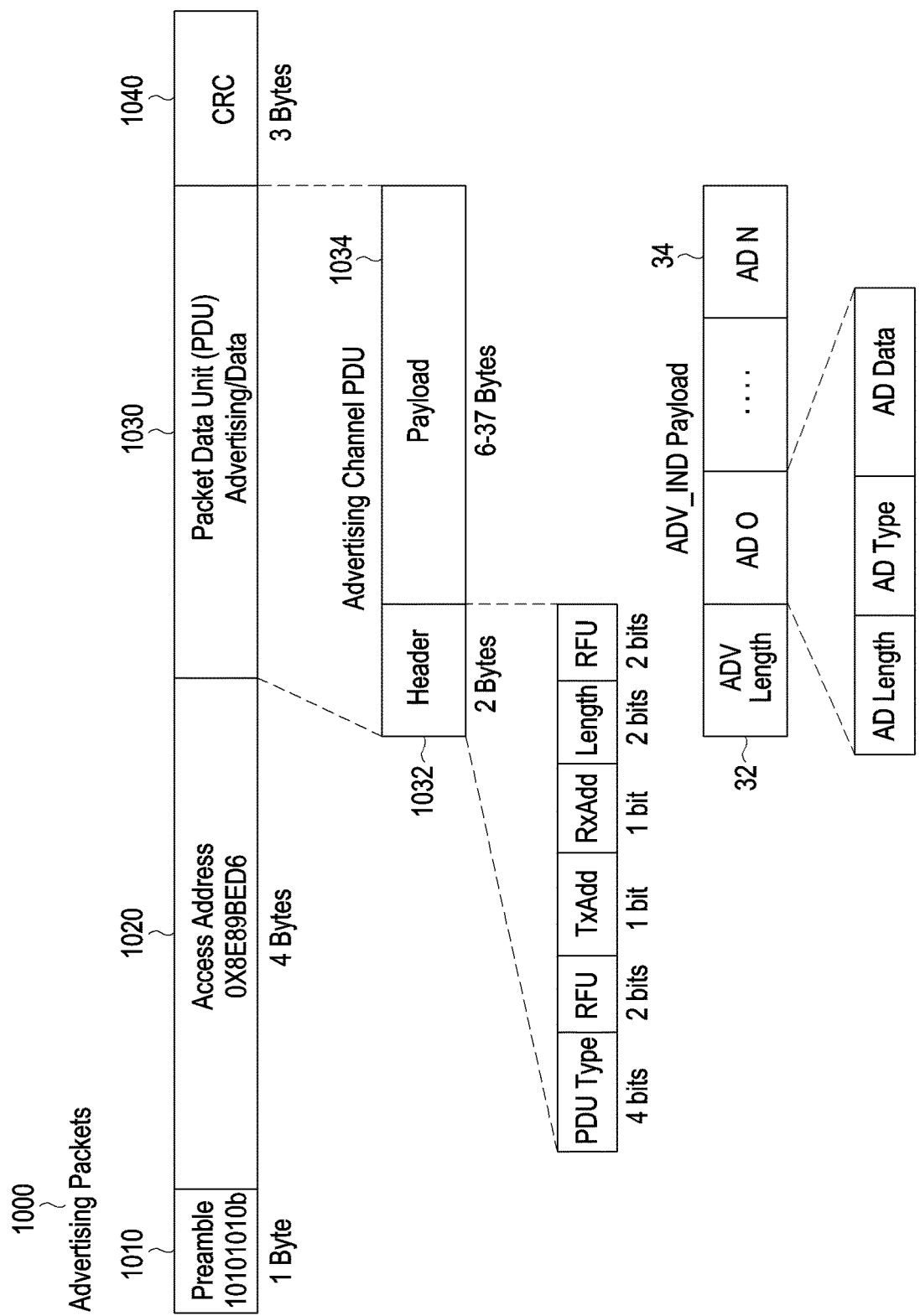
FIG. 10 is a diagram illustrating an advertising packet including a remote lock request message according to an embodiment.

FIG. 10 is a diagram illustrating an advertising packet including a remote lock request message according to an embodiment.

Referring to FIG. 10, an advertising packet 1000 according to an embodiment may include a preamble 1010, an access address 1020, a packet data unit (PDU) 1030, and a cyclic redundancy check (CRC) 1040. For example, the preamble 1010 may include 1-byte information (e.g., 10101010) for bit synchronization or frame synchronization. The access address 1020 is 4 bytes (e.g., 0x 8E89BED6) and may include an address for connection in the link layer. For example, the access address 1020 may include a pseudo-random 32-bit value generated by the remote electronic device in an initialized state. The packet data unit (PDU) 1030 may include advertising/data. The CRC 1040 may include 3-byte information for error detection of a PDU. The packet data unit (PDU) 1030 according to an embodiment may include a header 1032 and payload 1034. The header 1032 according to an embodiment may include a PDU type, RFU, TxAdd, RxAdd, Length, and RFU. The payload 1034 may include data. For example, the header 1032 may include ADV_Address 32 and the payload 1034 may include AD0 . . . ADn 34. According to an embodiment, the AD0 . . . ADn 34 may include AD length, AD Type, and AD data, respectively. For example, the remote lock request message may be included in AD data.

Figure 11:
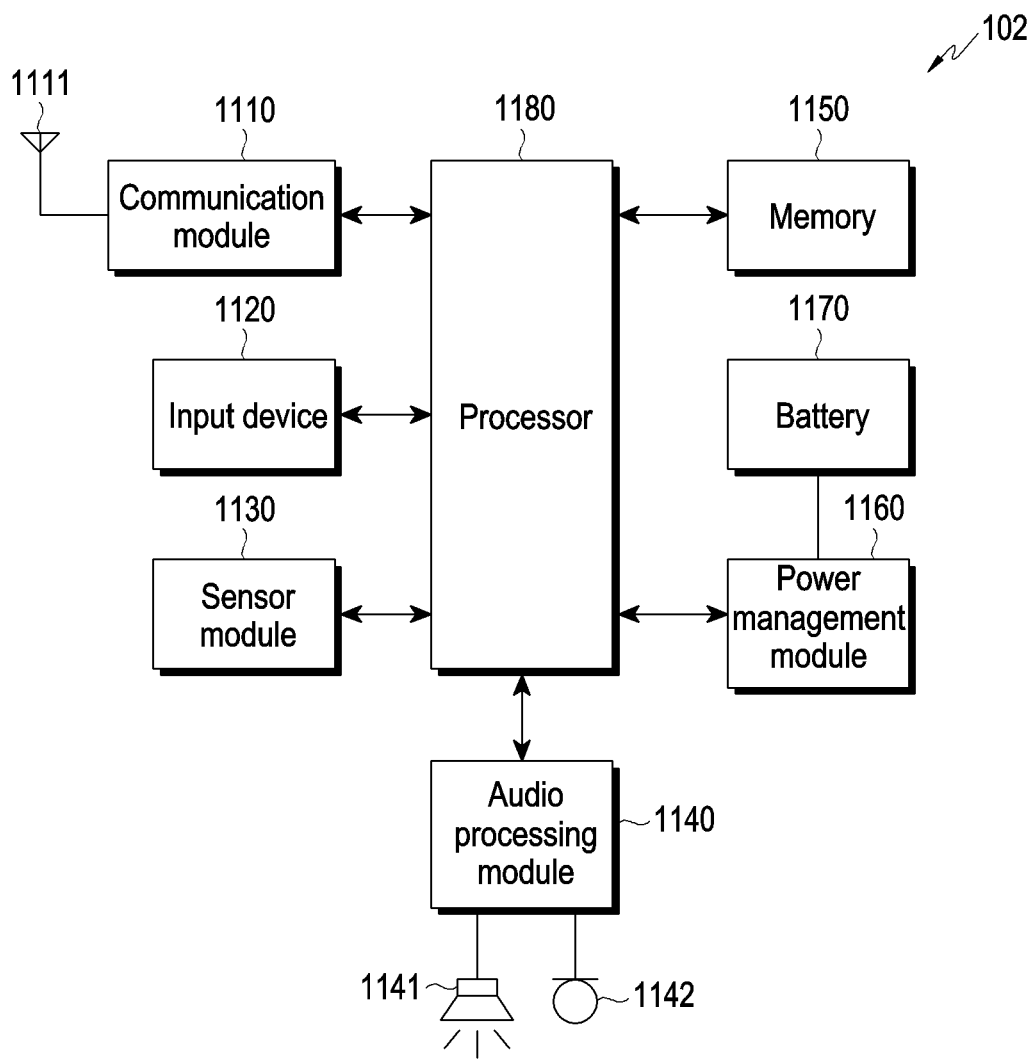
FIG. 11 is a block diagram illustrating an external electronic device according to an embodiment.

FIG. 11 is a block diagram illustrating an external electronic device according to an embodiment.

Referring to FIG. 11, the external electronic device 102 according to an embodiment may include a communication module (or communication circuit) 1110, an antenna 1111, an input device 1120, a sensor module (or a sensor) 1130, an audio processing module (or audio processing circuit) 1140, a memory 1150, a power management module (or power management circuit) 1160, a battery 1170, and a processor 1180.

According to an embodiment, the communication module 1110 may support wireless communication with the server 108. According to various embodiments, the communication module 1110 may support various types of communication by using the antenna 1111. According to an embodiment, the communication circuit 1110 may support short-range communication. The short-range communication may include, for example, wireless fidelity (WiFi), Bluetooth, near field communication (NFC), or a global navigation satellite system (GNSS). According to various embodiments, Bluetooth communication may include Bluetooth Legacy (or Classic) communication or BLE communication.

According to an embodiment, the processor 1180 may receive a Bluetooth-based advertising packet broadcasted from the remote electronic device 104. The processor 1180 according to an embodiment may identify and verify a remote lock request message included in the received advertising packet. For example, the processor 1180 may identify whether a message "remote lock request=Msg+MACKey (Msg)" is included in AD data of a manufacturer specific data type area included in the advertising packet. For example, when the message "remote lock request=Msg+MACKey(Msg)" is included, the processor 1180 may identify whether an ID included in the Msg (e.g., information related to the loss of the external electronic device 103) matches its own ID. When the IDs match, the processor 1190 may verify the validity of the Msg by using the MACKey (Msg) (e.g., authentication information shared with the external electronic device 102). According to an embodiment, when the ID included in the Msg matches its ID and the Msg is valid (e.g., Valid=Verifykey(Msg, MACkey (Msg))), the processor 1180 may identify that the remote lock request message has been successfully verified. According to an embodiment, when the ID included in the Msg does not match its ID or the Msg is invalid (e.g., Invalid=Verifykey(Msg, MACkey(Msg))), the processor 1180 may identify that the verification of the remote lock request message has failed. According to an embodiment, the processor 1180 may perform locking based on the identification and verification of the remote lock request message. For example, the processor 1180 may ignore the remote lock request message, when the remote lock request message has been identified and then the verification of the remote lock request message has failed. For example, when the remote lock request message has been identified and then the verification of the remote lock request message has been successful, the processor 1180 may perform locking based on the remote lock request message. According to an embodiment, in the locked state, the processor 1180 may be configured to pair only with a device that was or has been previously Bluetooth-paired, while rejecting Bluetooth-pairing with a new device. According to an embodiment, the external electronic device 102 may be configured to ignore a reset button input in the locked state.

According to an embodiment, the communication module 1110 may include various RF components between the antenna 1111 and the processor 1180. For example, during radio signal reception, the communication module 1110 may receive a radio signal from the antenna 1111, convert the received radio signal into a baseband signal, and transmit the converted baseband signal to the processor 1180. The processor 1180 may process the received baseband signal and control a human and/or mechanical interface of the external electronic device 102 in response to the received baseband signal. During radio signal transmission, the processor 1180 may generate a baseband signal and output the baseband signal to the communication module 1110. The communication module 1110 may receive the baseband signal from the processor 1180, convert the received baseband signal into a radio signal, and transmit the radio signal in the air through the antenna 1111. According to an embodiment, the communication module 1110 may support reception of audio data (or audio content) from the electronic device 101.

According to an embodiment, the input device 1120 may be configured to generate various input signals required for operations of the external electronic device 102. The input device 1120 may include a touch pad, a touch panel, and/or a button. The touch pad may recognize a touch input, for example, in at least one of a capacitive method, a pressure sensing method, an infrared method, and/or an ultrasonic method. When a capacitive touch pad is provided, a physical touch or proximity may be recognized. The touch pad may further include a tactile layer. The touch pad including a tactile layer may provide a tactile response to a user. The button may include, for example, a physical button or an optical key. According to various embodiments, the input device 1120 may generate a user input related to turn-on or turn-off of the external electronic device 102. According to various embodiments, the input device 1120 may generate a user input related to a communication (e.g., Bluetooth communication) connection to the electronic device 101. According to an embodiment, the input device 1120 may generate a user input related to audio data (or audio content). For example, the user input may be related to a function such as start, pause, stop, speed control, volume control, or mute for audio data. For example, the input device 1120 may include a touch pad, and an operation of the external electronic device 1102 may be controlled by various gestures such as a tap or swipe-up and swipe-down on the touch pad. According to an embodiment, when a gesture related to a single tap is detected through the touch pad, the external electronic device 102 (or the processor 1180) may reproduce audio data or pause the reproduction. According to an embodiment, when a gesture related to two taps is detected through the touch pad, the external electronic device 102 may switch the reproduction to the next audio data. According to an embodiment, when a gesture related to three taps is detected through the touch pad, the external electronic device 102 may switch the reproduction to the previous audio data. According to an embodiment, when a gesture of swiping up or down through the touch pad is detected, the external electronic device 102 may control the volume related to the reproduction of the audio data. According to an embodiment, when a call is received by the electronic device 101 and a double tap gesture is detected through the touch pad, the external electronic device 102 may cause the electronic device 101 to connect the call.

According to an embodiment, the sensor 1130 may measure a physical quantity or detect an operating state of the external electronic device 102. The sensor 1130 may convert measured or sensed information into an electrical signal. The sensor 1130 may include, for example, an acceleration sensor, a gyro sensor, a geomagnetic sensor, a magnetic sensor, a proximity sensor, a gesture sensor, a grip sensor, and/or a biometric sensor. According to an embodiment, the sensor 1130 may detect information or a signal indicating whether the external electronic device 102 has been worn by the user (e.g., coupled with an ear) or detect information or a signal indicating whether the external electronic device 102 has been coupled with another external device (e.g., a charging device). According to an embodiment, the external electronic device 102 may further include a member to be sensed by a sensor (not shown) of the another external device (e.g., a cradle to which a charging device or an audio electronic device is coupled). For example, the external electronic device 102 may include a magnet that may be detected by a hall integrated circuit (IC) installed in the another external device. When the external electronic device 102 is coupled to the another external device, the hall IC of the another external device may recognize the magnet installed in the external electronic device 102 and output a signal related to the coupling between the another external device and the external electronic device 102. According to an embodiment, the external electronic device 102 may be powered on or off according to whether the another external device and the external electronic device 102 have been coupled to each other.

According to an embodiment, the audio processing circuit 1140 may support an audio data collection function. The audio processing circuit 1140 may reproduce collected audio data. According to an embodiment, the audio processing circuit 1140 may include an audio decoder (not shown) and a digital to analog (D/A) converter (not shown). The audio decoder may convert audio data stored in the memory 1150 into a digital audio signal. The D/A converter may convert the digital audio signal converted by the audio decoder into an analog audio signal. According to various embodiments, the audio decoder may convert audio data which has been received from the electronic device 101 through the communication module 1110 and stored in the memory 1150 into a digital audio signal. A speaker 1141 may output the analog audio signal converted by the D/A converter. According to an embodiment, the audio processing circuit 1140 may include an analog to digital (A/D) converter (not shown). The A/D converter may convert an analog voice signal received through a microphone 1142 into a digital voice signal. According to an embodiment, the audio processing circuit 1140 may reproduce various audio data configured in an operation of the external electronic device 102. For example, in a case of the external electronic device 102 being a wireless earphone, when coupling or removal of the external electronic device 102 to or from the ear, the audio processing circuit 1140 may be designed to reproduce audio data related to a corresponding effect or notification sound. According to an embodiment, when the external electronic device 102 is detected as being coupled to an external device (e.g., a charging device) or the external electronic device is detected as disconnected from the external device, the audio processing circuit 1140 may be designed to reproduce audio data related to a corresponding effect or notification sound. The sound effect or notification sound may not be generated according to a user setting or a designer's intention. According to various embodiments, the audio processing circuit 1140 may be designed to be incorporated in the processor 1180.

According to an embodiment, the memory 1150 may store data or an application program and an algorithm corresponding to various operating systems and various user functions required for operations of the external electronic device 102. The memory 1150 may include, for example, a high-speed random access memory (RAM), such as one or more magnetic disk storage devices, and/or a non-volatile memory, one or more optical storage devices and/or a flash memory (e.g., NAND or NOR). According to an embodiment, the memory 1150 may include a non-volatile memory that stores first audio data (non-volatile audio data) received from the electronic device 101. According to an embodiment, the memory 1150 may include a volatile memory that stores second audio data (volatile audio data) received from the electronic device 101.

According to an embodiment, the power management module (or circuit) 1160 (e.g., a power management integrated circuit (PMIC)) may efficiently manage and optimize the power use of the battery 1170 within the external electronic device 102. According to an embodiment, the processor 1180 may transmit a signal corresponding to a load to be processed to the power management circuit 1160. The power management circuit 1160 may adjust power supplied to the processor 1180. According to an embodiment, the power management circuit 1160 may include a battery charging circuit. According to an embodiment, when the external electronic device 102 is coupled to an external device (e.g., a charging device), the power management circuit 260 may receive power from the external device to charge the battery 1170. According to an embodiment, the power management circuit 1160 may include a wireless charging circuit. The wireless charging circuit may wirelessly receive power from an external device through the antenna 1141 and charge the battery 1170 with the received power.

According to an embodiment, the external electronic device 102 may include a display device (not shown). The display device may be configured to provide various screen interfaces related to operations of the external electronic device 102. The display device may provide a user interface related to reproduction of audio data. According to various embodiments, the display device may provide a user interface related to a function of receiving audio data from the electronic device 101 or a function of transmitting audio data to the electronic device 101. According to various embodiments, the display device may include a light emitting means such as a light emitting diode (LED). For example, the light emitting means may be controlled to emit a color corresponding to charging or completion of charging. For example, when the external electronic device 102 is communicatively coupled to the electronic device 101, the light emitting means may be controlled to emit a specific color. For example, the light emitting means may be controlled to emit a specific color according to the reproduction state of the audio data (e.g., during reproduction or while reproduction is paused). For example, according to a user input generated through the input device, the light emitting means may be controlled to emit a specific color.

According to an embodiment, the processor 1180 may be configured to control at least one of control of various signals, information collection, or output, which is related to audio data. The processor 1180 may support various operations based on at least a part of a user input from the input device 1120. According to an embodiment, the processor 1180 may turn on or off the external electronic device 102 according to a user input.

According to an embodiment, the processor 1180 may communicatively couple the external electronic device 102 to the electronic device 101 through Bluetooth-based communication according to a user input. According to an embodiment, the processor 1180 may receive audio data from the electronic device 101 or transmit audio data to the electronic device 101 according to a user input. According to an embodiment, the external electronic device 102 may output an audio signal received from the electronic device 101 to the speaker 1141, while being coupled to the electronic device 101 and another audio electronic device, and transmit information for allowing the another external electronic device to obtain the audio signal from the electronic device 101. According to an embodiment, the external electronic device 102 may output an audio signal received from the electronic device 101 to the speaker 1141, while being coupled to the electronic device 101 and another external electronic device, and transmit the audio signal received from the electronic device 101 to the another external electronic device.

According to an embodiment, the processor 1180 may reproduce audio data or control the reproduction of the audio data according to a user input (e.g., start, pause, stop, speed control, volume control, or mute for the audio data). According to an embodiment, the processor 1180 may receive an audio signal from the electronic device 101 and output the received audio signal through the speaker 1141. According to an embodiment, the processor 1180 may perform various operations based on at least a part of information obtained from the sensor 1130. According to an embodiment, the processor 1180 may determine whether the external electronic device 102 is worn by the user (e.g., worn on an ear) from information obtained from the sensor 1130. When the external electronic device 102 is identified as worn on the ear, the processor 1180 may reproduce audio data stored in the memory 1150 according to a user input for audio data reproduction and output the audio data to the speaker 1141. According to various embodiments, when the external electronic device 102 is identified as not worn on the ear in a mode in which the external electronic device 102 receives audio data from the external device, reproduces the audio data, and outputs the reproduced audio data to the speaker 1141, the processor 1180 may stop the mode or transmit a signal related to stopping the mode to the electronic device 101. The electronic device 101 may receive a signal regarding the state in which the external electronic device 102 is not worn on the ear, and discontinue the transmission of the audio data to the external electronic device 102. According to various embodiments, when the external electronic device 102 is identified as not worn on the ear in a mode in which the external electronic device 102 receives an audio signal from the electronic device 101 and outputs the audio signal to the speaker 1141, the processor 1180 may stop the mode or transmit a signal related to stopping the mode to the external device. The electronic device 101 may receive a signal regarding a state in which the external electronic device 102 is not worn on the ear, and may stop the reproduction of the audio data and the transmission of the audio signal. According to various embodiments, when the external electronic device 102 is identified as worn on the ear, the processor 1180 may activate a biometric sensor (e.g., a heart rate sensor). When the external electronic device 102 is identified as not worn on the ear, the processor 1180 may deactivate the biometric sensor.

According to an embodiment, the external electronic device 102 may provide a voice recognition function for generating a voice command from an analog voice signal received through the microphone 1142. The voice command may relate to an input to support reception, transmission, or reproduction of audio data.

According to an embodiment, when a communication connection has not been established or establishment of the communication connection has failed during a specified time after the communication connection to the electronic device 101 was terminated, the processor 1180 may operate in the locked state (or locked mode) (and/or recognize loss of the electronic device 101). According to an embodiment, when the external electronic device 102 is identified as not worn on the ear in the state in which a communication connection has not been established or establishment of the communication connection has failed during the specified time after the communication connection to the electronic device 101 was terminated, the processor 1180 may operate in the locked state (or locked mode) (and/or recognize loss of the electronic device 101). For example, the processor 1180 may not be reset or perform a pairing operation with an external device in the locked mode. For example, in the locked state, the processor 1180 may be configured to pair only with a device which was or has been Bluetooth-paired with the external electronic device 102, while rejecting Bluetooth pairing with a new device. For example, the processor 1180 may be configured to ignore a reset button input in the locked state.

According to an embodiment, the external electronic device 102 may further include various modules according to its provision type. Although various variations are available due to the trend of convergence of digital devices and thus all of the variations may not be enumerated herein, components equivalent to the above-described components may be additionally included in the external electronic device 102. Further, according to an embodiment, specific components may be excluded from the above components or replaced with other components in the external electronic device 102 according to the provision type of the external electronic device 102, which will be easily understood by those skilled in the art. According to an embodiment, the external electronic device 102 may operate as one of a pair of audio electronic devices, for example, a first audio electronic device (e.g., a first earphone, a main earphone, or a right earphone) or a second audio electronic device (e.g., a second earphone, a sub-earphone, or a left earphone).

Figure 12:
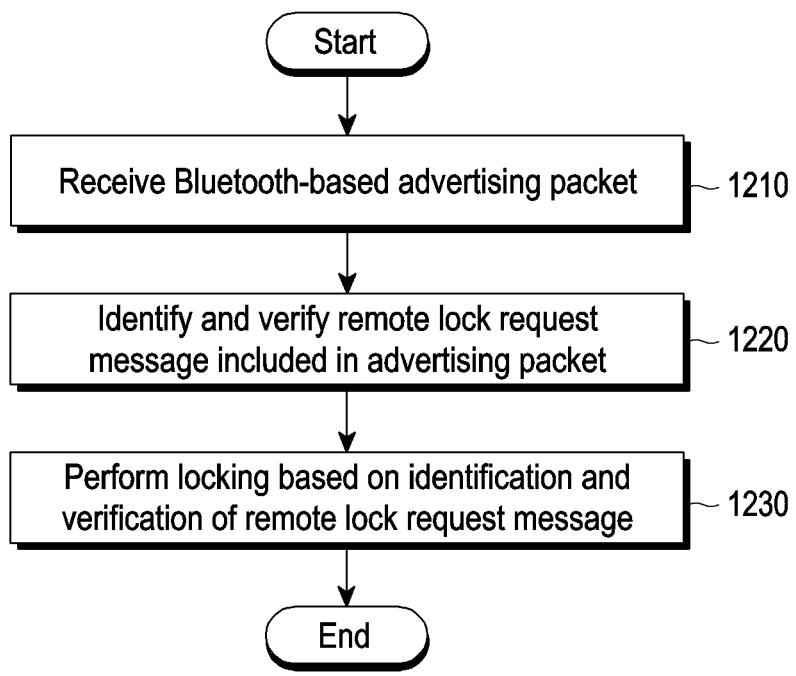
FIG. 12 is a flowchart illustrating an operation of an external electronic device according to an embodiment.

FIG. 12 is a flowchart illustrating an operation of an external electronic device according to an embodiment.

Referring to FIG. 12, the processor of the external electronic device 102 (e.g., the processor 1180 of FIG. 11) according to an embodiment may perform at least one of operations 1210 to 1230.

In operation 1210, the processor 1180 according to an embodiment may receive a Bluetooth-based advertising packet broadcasted from the remote electronic device 104 through the communication module 1110.

In operation 1220, the processor 1180 according to an embodiment may identify and verify a remote lock request message included in the received advertising packet. For example, the processor 1180 may identify whether a message "remote lock request=Msg+MACKey(Msg)" is included in AD data of a manufacturer specific data type area included in the advertising packet. For example, when the message "remote lock request=Msg+MACKey(Msg)" is included, the processor 1180 may identify whether an ID included in the Msg (e.g., information related to the loss of the external electronic device 103) matches its own ID. When the IDs match, the processor 1180 may verify validity of the Msg by using the MACKey(Msg) (e.g., authentication information shared with the electronic device 101). According to an embodiment, when the ID included in the Msg matches its ID and the Msg is valid (Valid=Verifykey(Msg, MACkey(Msg))), the processor 1180 may identify that the remote lock request message has been successfully verified. According to an embodiment, when the ID included in the Msg does not match its ID or the Msg is invalid (Invalid=Verifykey(Msg, MACkey(Msg))), the processor 1180 may identify that the verification of the remote lock request message has failed.

In operation 1230, according to an embodiment, the processor 1180 may perform locking based on the identification and successful verification of the remote lock request message. For example, when identifying the remote lock request message and then failing in verifying the remote lock request message, the processor 1180 may ignore the remote lock request message. For example, when identifying the remote lock request message and then succeeding in verifying the remote lock request message, the processor 1180 may perform locking based on the remote lock request message. According to an embodiment, in the locked state, the processor 1180 may be configured to pair only with a device that was or has been previously Bluetooth-paired, while rejecting Bluetooth-pairing with a new device. According to an embodiment, the external electronic device 102 may be configured to ignore a reset button input in the locked state.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "1st" and "2nd" or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, logic, logic block, part, or circuitry. A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term 'non-transitory' simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

At least one of the components, elements, modules or units (collectively "components" in this paragraph) represented by a block in the drawings may be embodied as various numbers of hardware, software and/or firmware structures that execute respective functions described above, according to an example embodiment. According to example embodiments, at least one of these components may use a direct circuit structure, such as a memory, a processor, a logic circuit, a look-up table, etc. that may execute the respective functions through controls of one or more microprocessors or other control apparatuses. Also, at least one of these components may be specifically embodied by a module, a program, or a part of code, which contains one or more executable instructions for performing specified logic functions, and executed by one or more microprocessors or other control apparatuses. Further, at least one of these components may include or may be implemented by a processor such as a central processing unit (CPU) that performs the respective functions, a microprocessor, or the like. Two or more of these components may be combined into one single component which performs all operations or functions of the combined two or more components. Also, at least part of functions of at least one of these components may be performed by another of these components. Functional aspects of the above exemplary embodiments may be implemented in algorithms that execute on one or more processors. Furthermore, the components represented by a block or processing steps may employ any number of related art techniques for electronics configuration, signal processing and/or control, data processing and the like.

According to various example embodiments, in a non-statutory storage medium storing instructions, which when executed by at least one processor, cause the at least one processor to perform at least one operation, the at least one operation may include storing authentication information shared with an external electronic device during a Bluetooth-based connection between the electronic device and the external electronic device; identifying whether or not the external electronic device is lost based on failure of the communication connection to the external electronic device for a specified time period; in response to identifying that the electronic device is lost, obtaining information related to the loss of the external electronic device; generating a remote lock request message including the information related to the loss of the external electronic device and the authentication information shared with the external electronic device; and transmitting the remote lock request message to an external server through a communication module.

The example embodiments of the disclosure described and illustrated in the specification and the drawings are merely provided as specific examples to easily explain the technical content according to the embodiments of the disclosure and help the understanding of the embodiments of the disclosure, not intended to limit the scope of the embodiments of the disclosure. Therefore, the scope of various embodiments of the disclosure should be interpreted as encompassing all changes or modifications derived from the technical idea of various embodiments of the disclosure as well as the embodiments of the disclosure.

What is claimed is:

1. An electronic device comprising:
   a communication interface;
   memory for storing instructions and authentication information shared with an external electronic device; and
   a processor,
   wherein the instructions, when executed by the processor, cause the electronic device to:
   identify a loss of the external electronic device based on a failure of a first communication connection to the external electronic device for a first specified time period;
   obtain information related to the loss of the external electronic device, and generate a remote lock request message requesting locking of the external electronic device, the remote lock request message including the information related to the loss of the external electronic device and the authentication information shared with the external electronic device;
   transmit the remote lock request message to an external server through the communication interface;
   receive, from the external server, a message indicating that transmission of the remote lock request message from the external server to at least one remote electronic device is successful or failed; and
   based on a second communication connection with the external electronic device being established after the transmitting the remote lock request message, transmit, to the external server through the communication interface, information indicating that the external electronic device is unlocked, and
   wherein the information related to the loss of the external electronic device comprises a time and location of a most recently terminated Bluetooth pairing between the electronic device and the external electronic device, and a determined type of movement of a user of the electronic device from among vehicle transpiration and walking collected during a time period starting before an estimated time point of the loss of the external electronic device and ending after the estimated time point of the loss of the external electronic device.

2. The electronic device of claim 1, wherein the authentication information includes an authentication key shared during a Bluetooth-based connection between the electronic device and the external electronic device.

3. The electronic device of claim 1, wherein the information related to the loss of the external electronic device further comprises at least one of an identifier (ID) of the external electronic device, a location of the loss of the external electronic device, or a time of the loss of the external electronic device.

4. A server comprising:
   a communication interface;
   memory configured to store program code; and
   a processor configured to access the memory, read the program code, and operate according to the program code,
   wherein the program code, when executed by the processor, causes the server to:
   receive, from an electronic device, a remote lock request message for an external electronic device, the remote lock request message requesting locking of the external electronic device;
   identify at least one remote electronic device corresponding to a location of a loss of the external electronic device by using the received remote lock request message; and
   transmit the remote lock request message to the identified at least one remote electronic device;
   transmit, to the electronic device, a message indicating that transmission of the remote lock request message from the server to the at least one remote electronic device is successful or failed; and
   based on a communication connection with the external electronic device being established after the transmitting the remote lock request message, receive, from the electronic device through the communication interface, information indicating that the external electronic device is unlocked,
   wherein the remote lock request message comprises information related to the loss of the external electronic device, and
   wherein the information related to the loss of the external electronic device comprises a time and location of a most recently terminated Bluetooth pairing between the electronic device and the external electronic device, and a determined type of movement of a user of the electronic device from among vehicle transpiration and walking collected during a time period starting before an estimated time point of the loss of the external electronic device and ending after the estimated time point of loss of the external electronic device.

5. The server of claim 4, wherein the program code, when executed by the processor, causes the server to identify, based on first location information received from each of a plurality of electronic devices, the at least one remote electronic device having second location information corresponding to the location of the loss of the external electronic device.

6. The server of claim 4, wherein the remote lock request message further comprises authentication information shared between the electronic device and the external electronic device.

7. The server of claim 6, wherein the information related to the loss of the external electronic device further comprises at least one of an identifier (ID) of the external electronic device, the location of the loss of the external electronic device, or a time of the loss of the external electronic device.

8. A remote electronic device comprising:
- a communication interface;
- a memory configured to store program code; and
- a processor configured to access the memory, read the program code, and operate according to the program code,
- wherein the program code, when executed by the processor, causes the remote electronic device to:
  - receive a remote lock request message from a server, the remote lock request message requesting locking of an external electronic device; and
  - generate a Bluetooth-based advertising packet including the remote lock request message, and broadcast the Bluetooth-based advertising packet,
- wherein the remote lock request message includes information related to a loss of the external electronic device, and
- wherein the information related to the loss of the external electronic device comprises a time and location of a most recently terminated Bluetooth pairing between the electronic device and the external electronic device, and a determined type of movement of a user of the electronic device from among vehicle transpiration and walking collected during a time period starting before an estimated time point of the loss of the external electronic device and ending after the estimated time point of the loss of the external electronic device.

9. The remote electronic device of claim 8, wherein the program code, when executed by the processor, causes the remote electronic device to include the remote lock request message in an advertisement (AD) data area of a manufacturer specific data type area of the Bluetooth-based advertising packet.

10. The remote electronic device of claim 8, wherein the remote lock request message further comprises authentication information shared between another electronic device and the external electronic device.

11. The remote electronic device of claim 10, wherein the information related to the loss of the external electronic device further comprises at least one of an identifier (ID) of the external electronic device, a location of the loss of the external electronic device, or a time of the loss of the external electronic device.

12. A method of controlling remote locking of an external electronic device based on Bluetooth, the method being performed by an electronic device, and comprising:
- storing authentication information, which is shared with the external electronic device during a Bluetooth-based connection between the electronic device and the external electronic device;
- identifying a loss of the external electronic device based on a failure of the Bluetooth-based connection to the external electronic device for a first specified time period;
- obtaining information related to the loss of the external electronic device;
- generating a remote lock request message requesting locking of the external electronic device, the remote lock request message including the information related to the loss of the external electronic device and the authentication information shared with the external electronic device;
- transmitting the remote lock request message to an external server through a communication interface;
- receiving, from the external server, a message indicating that transmission of the remote lock request message from the external server to at least one remote electronic device is successful or failed; and
- based on a communication connection being established with the external electronic device after the transmitting the remote lock request message, transmitting, to the external server through the communication interface, information indicating that the external electronic device is unlocked, and
- wherein the information related to the loss of the external electronic device comprises a time and location of a most recently terminated Bluetooth pairing between the electronic device and the external electronic device, and a determined type of movement of a user of the electronic device from among vehicle transpiration and walking collected during a time period starting before an estimate time point of the loss of the external electronic device and ending after the estimated time point of the loss of the external electronic device.

13. The method of claim 12, wherein the information related to the loss of the external electronic device further includes at least one of an identifier (ID) of the external electronic device, a location of the loss of the external electronic device, or a time of the loss of the external electronic device.

14. A method of transmitting a remote lock request message for an external electronic device, the method being performed by a server and comprising:
- receiving the remote lock request message from an electronic device, the remote lock request message requesting locking of the external electronic device;
- identifying at least one remote electronic device corresponding to a location of a loss of the external electronic device by using the received remote lock request message;
- transmitting the remote lock request message to the identified at least one remote electronic device;
- transmitting, to the electronic device, a message indicating that transmission of the remote lock request message from the server to the at least one remote electronic device is successful or failed; and
- based on a communication connection with the external electronic device being established after the transmitting the remote lock request message, receiving, from the electronic device through a communication interface, information indicating that the external electronic device is unlocked,
- wherein the remote lock request message includes information related to the loss of the external electronic device, and
- wherein the information related to the loss of the external electronic device comprises a time and location of a most recently terminated Bluetooth pairing between the electronic device and the external electronic device, and a determined type of movement of a user of the electronic device from among vehicle transpiration and walking collected during a time period starting before an estimated time point of the loss of the external electronic device and ending after the estimated time point of loss of the external electronic device.

15. The method of claim 14, wherein the remote lock request message further includes authentication information shared between the electronic device and the external electronic device.

16. The method of claim 15, wherein the information related to the loss of the external electronic device further includes at least one of an identifier (ID) of the external electronic device, the location of the loss of the external electronic device, or a time of the loss of the external electronic device.

17. A method of controlling remote locking of an external electronic device based on Bluetooth, the method being performed by a remote electronic device and comprising:
    receiving a remote lock request message for the external electronic device from an outside, the remote lock request message requesting locking of the external electronic device;
    generating a Bluetooth-based advertising packet including the remote lock request message, and broadcasting the Bluetooth-based advertising packet,
    wherein the remote lock request message includes information related to a loss of the external electronic device, and
    wherein the information related to the loss of the external electronic device comprises a time and location of a most recently terminated Bluetooth pairing between the electronic device and the external electronic device, and a determined type of movement of a user of the electronic device from among vehicle transpiration and walking collected during a time period starting before an estimated time point of the loss of the external electronic device and ending after the estimated time point of the loss of the external electronic device.

18. The method of claim 17, wherein the remote lock request message is included in an advertisement (AD) data area of a manufacturer specific data type area of the Bluetooth-based advertising packet.

19. The method of claim 17, wherein the remote lock request message further includes authentication information shared between another electronic device and the external electronic device.

20. A non-transitory computer readable storage medium storing instructions, which are executable by at least one processor to cause the at least one processor to perform:
    storing authentication information, which is shared with an external electronic device during a Bluetooth-based connection between an electronic device and the external electronic device;
    identifying a loss of the external electronic device based on a failure of the Bluetooth-based connection to the external electronic device for a specified time period;
    obtaining information related to the loss of the external electronic device;
    generating a remote lock request message requesting locking of the external electronic device, the remote lock request message including the information related to the loss of the external electronic device and the authentication information shared with the external electronic device; and
    transmitting the remote lock request message to an external server through a communication interface;
    receiving, from the external server, a message indicating that transmission of the remote lock request message from the external server to at least one remote electronic device is successful or failed; and
    based on a communication connection with the external electronic device being established after the transmitting the remote lock request message, receiving, from the electronic device through the communication interface, information indicating that the external electronic device is unlocked,
    wherein the information related to the loss of the external electronic device comprises a time and location of a most recently terminated Bluetooth pairing between the electronic device and the external electronic device, and a determined type of movement of a user of the electronic device from among vehicle transpiration and walking information on surroundings of the external electronic device collected during a time period starting before an estimated time point of the loss of the external electronic device and ending after the estimated time point of the loss of the external electronic device.

* * * * *